Figure 4:
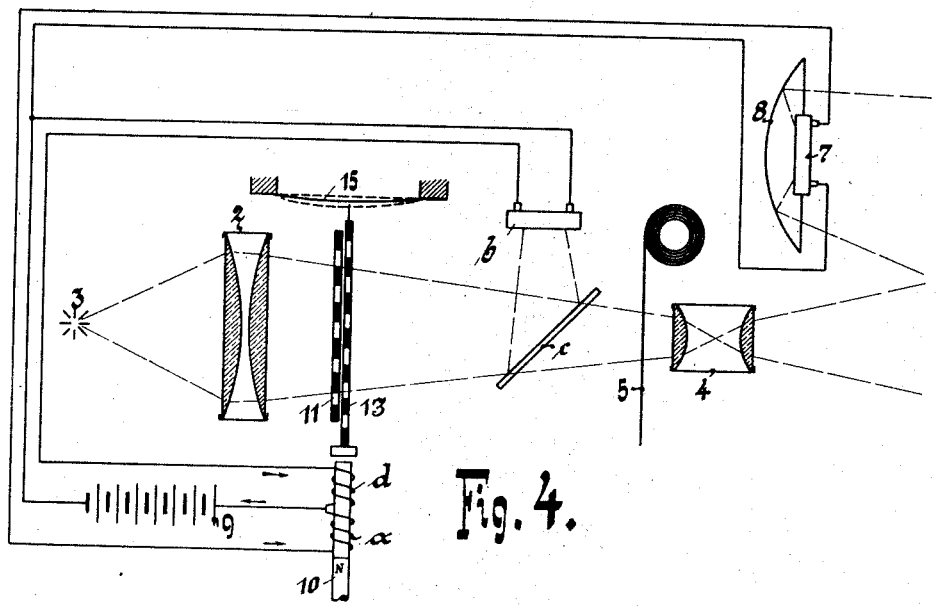

B. GWOZDZ.
MEANS FOR REGULATING THE ILLUMINATION OF FILMS IN KINEMATOGRAPHS.
APPLICATION FILED JULY 24, 1909.
947,490.
Patented Jan. 25, 1910.
4 SHEETS—SHEET 1.
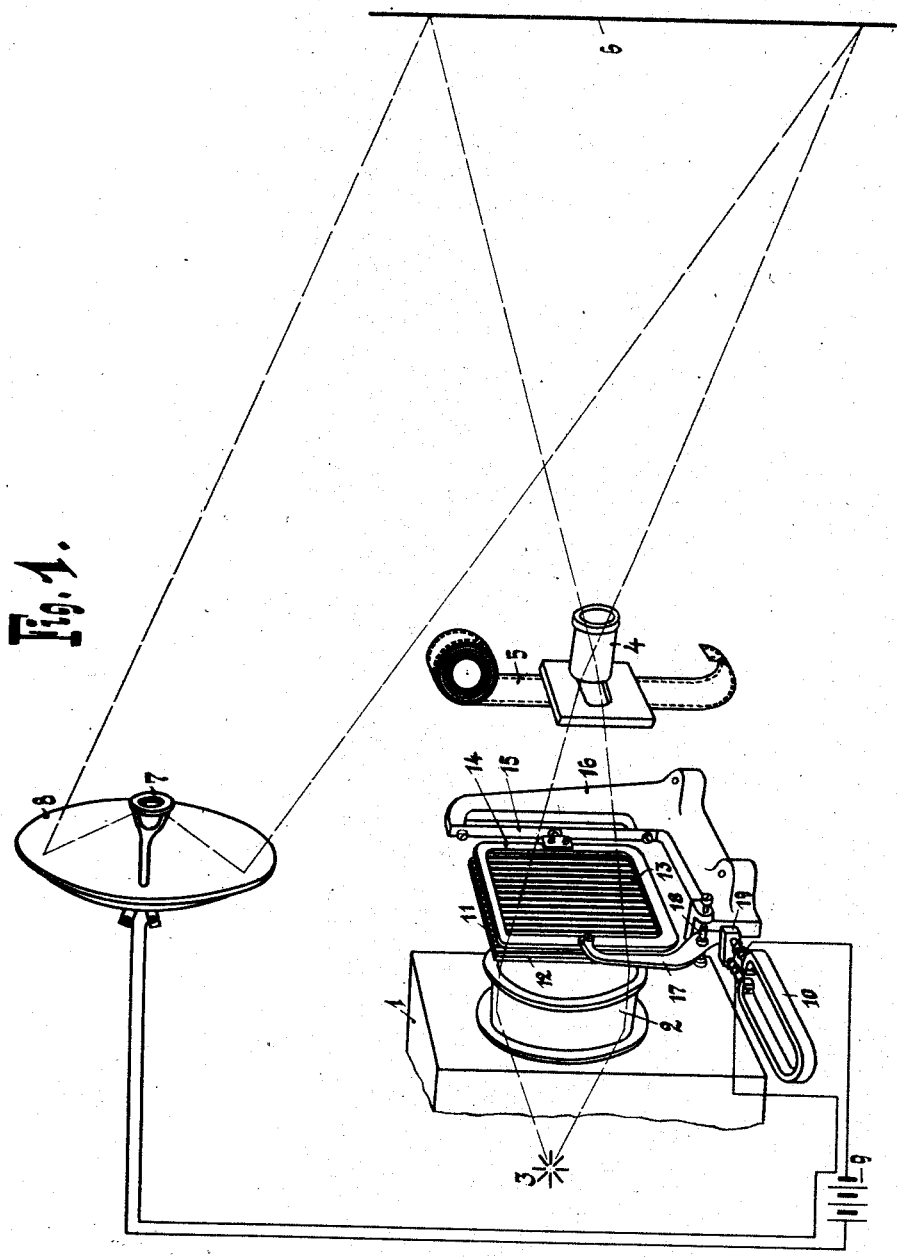

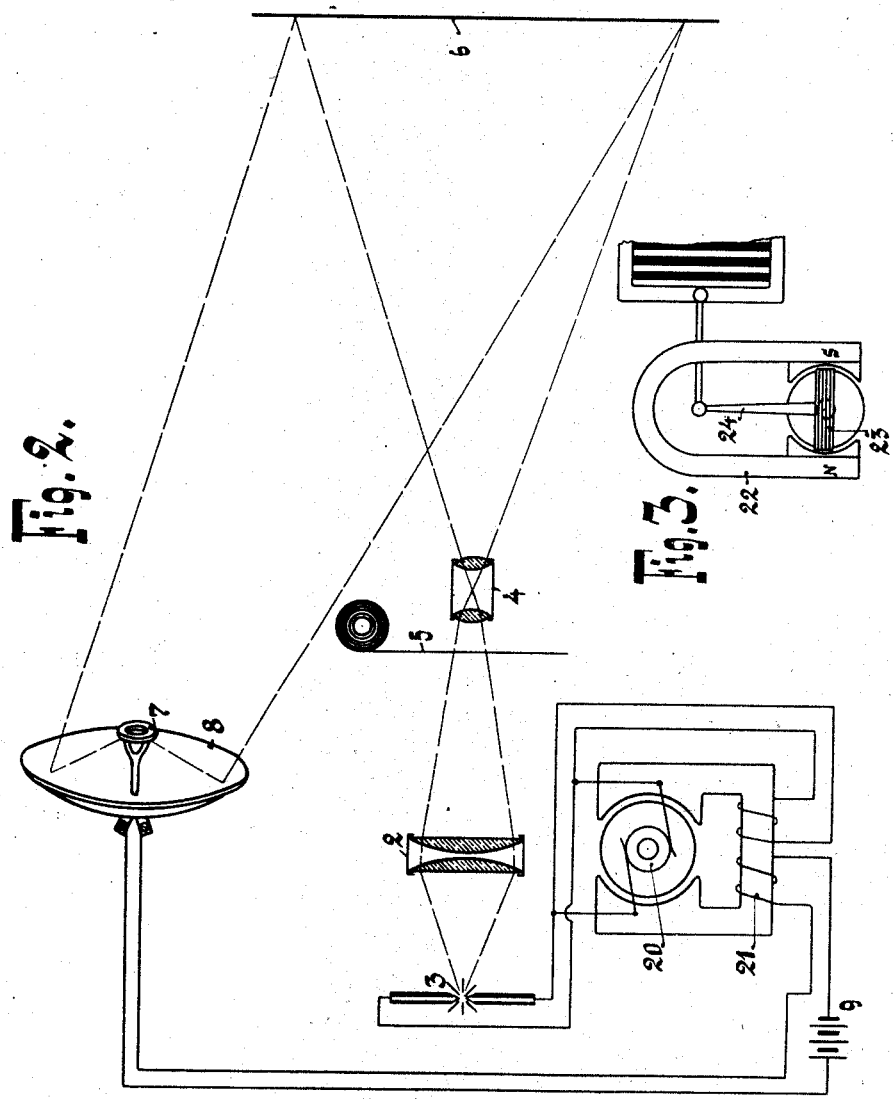

B. GWOZDZ.
MEANS FOR REGULATING THE ILLUMINATION OF FILMS IN KINEMATOGRAPHS.
APPLICATION FILED JULY 24, 1909.

947,490.

Patented Jan. 25, 1910.

4 SHEETS—SHEET 3.

Witnesses:

Inventor,

B. GWOZDZ.
MEANS FOR REGULATING THE ILLUMINATION OF FILMS IN KINEMATOGRAPHS.
APPLICATION FILED JULY 24, 1909.
947,490.
Patented Jan. 25, 1910.
4 SHEETS—SHEET 4.
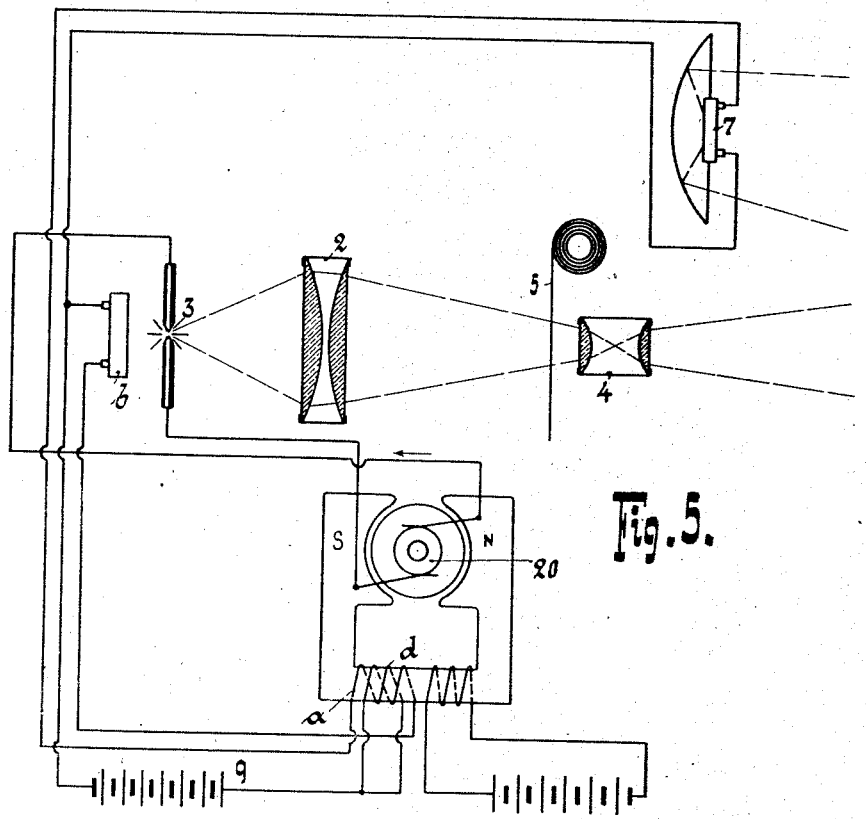
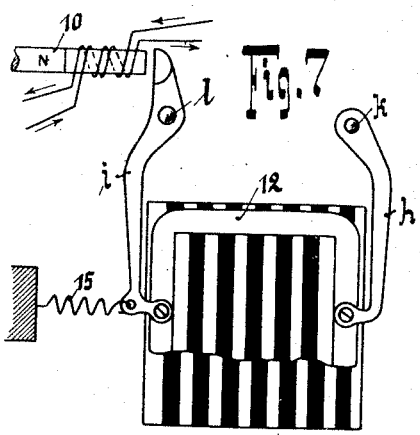
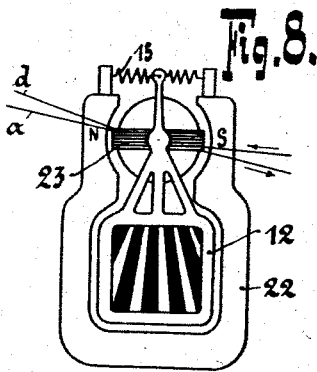

UNITED STATES PATENT OFFICE.

BRONISŁAW GWÓZDZ, OF SCHMARGENDORF, NEAR BERLIN, GERMANY.

MEANS FOR REGULATING THE ILLUMINATION OF FILMS IN KINEMATOGRAPHS.

947,490. Specification of Letters Patent. Patented Jan. 25, 1910.

Application filed July 24, 1909. Serial No. 509,369.

*To all whom it may concern:*

Be it known that I, BRONISŁAW GWÓZDZ, a subject of the Czar of Russia, and residing at Schmargendorf, near Berlin, Germany, have invented certain new and useful Improvements in Means for Regulating the Illumination of Films in Kinematographs, of which the following is a specification.

The subject-matter of my invention is improved means for regulating the illumination of unevenly transparent films in kinematographs.

The circumstance that, when kinematographic films are copied, very different perviousness of the films to light is obtained, *e. g.* owing to fluctuations in the luminosity of the lamp or owing to unequal development, causes considerable and frequent fluctuation of the brightness on the sheet when the pictures are projected which greatly tires the spectator's eye and produces a flickering sensation. Also owing to pictures having a dark background being sometimes replaced by others having a bright background and thus sometimes more and sometimes less light being reflected by the sheet, the optic nerves tire rapidly, even if in the latter instance it is endeavored to avoid too great differences by regulating the lamp by hand.

Now a primary object of my invention is to provide purely automatic means for keeping the quantity of light reflected from the sheet always at one normal value, it being indifferent whether the film is more transparent at the part which is projected at any instant than at the other parts. I attain this end by arranging that the light reflected by the sheet acts on a selenium cell, by which the light proceeding from the source of light is regulated corresponding to the transparency of the part of the film located in front of the objective at any instant either by the source of light itself being influenced or by a screen, *e. g.* in the form of a two-part lined screen, located in front of the source of light being correspondingly adjusted. I have found, however, that with these means it is not possible to equalize completely the fluctuations of the brilliancy of the pictures on the sheet, but that in reality it is only possible to diminish these fluctuations by one-half. The cause of this is that in my above described means the circumstance is not taken into consideration that at the moment when the screen begins its action with regard to regulating the light in order to bring the total light of the projected picture on the sheet to the normal value, the resistance of the selenium cell also simultaneously varies, *i. e.* does not remain constant, and these variations of resistance in the selenium cell occur under the influence of the movement of the screen in such manner that the resistance will approach a normal value in agreement with the equalization of the difference in brilliancy of the projected picture. Consequently with such means the final adjustment of the screen must be less than is necessary for perfectly equalizing the temporary difference in brilliancy.

In order to make non-injurious the reaction of the screen on the selenium cell, according to my invention I provide in addition to the above mentioned selenium cell a second selenium cell which, however, is influenced by the light radiated by the source of light but not by the light which has passed through the film, which second cell acts either likewise on the same polarized magnet or on the field winding of the dynamo-electric machine in combination with the former selenium cell in such manner that in the same measure as the force of the magnet is varied under the influence of the changes in resistance of the first selenium cell due to the movement of the screen, does the second selenium cell bring this force of the magnet simultaneously to the same value again, and consequently the total force of the magnet remains the same as that which was brought about in the magnet temporarily owing to the first selenium cell being illuminated above or under the normal. The consequence of this is that in spite of the first selenium cell not being able to maintain its resistance which was produced by excessive or deficient illumination, as soon as the diminution or increase of light on the sheet has begun owing to the corresponding movement of the screen, so that, as already mentioned, it is not possible to move the screen so much as to obtain perfect equalization of the temporary differences in light in proportion to that quantity of light on the sheet which is taken as normal, it is nevertheless possible with the aid of the second selenium cell to move the screen so much that the excess or deficiency of light on the sheet is entirely done away with and that the screen can continue to remain in the same position in spite of the first selenium cell in this event possessing the same resistance as when portions of the film of normal transparency are projected. The action thus solely depends on the mutual influence of the variations of resistance caused by the two selenium cells on the iron cores polarized by the permanent magnets. In the normal condition, i. e. when the parts of the projected film located in front of the objective have average transparency and the screen is in such a position that the lines of the same are half opened, the currents traversing the two selenium cells are equal and simultaneously flow around their iron cores in opposite directions, therefore at that moment exercise no influence on the iron cores, because in such a condition their magnetizing actions reciprocally cancel one another. Therefore in this event the position of the screen or armature operating it depends solely on the amount of magnetism which the permanent magnet constantly produces in its two iron cores. Now the current of the circuit containing the first selenium cell flows in such a direction around the iron cores that it tends to destroy the magnetism produced by the permanent magnet in its iron cores. The current which flows through the circuit containing the second selenium cell, however, exercises such an action by means of the windings on the iron cores that it tends to increase just as much the magnetism produced by the permanent magnet. When the current in the circuit containing the first selenium cell has risen a certain percentage, however, e. g. owing to increased illumination of the first selenium cell and the reduced resistance occasioned thereby, the magnetism produced in the iron core by the permanent magnet is first diminished correspondingly. The diminution of the magnetic force of the iron core of the magnet causes the armature with the screen to be moved away from the magnet under the influence of the spring acting on the screen; this movement takes place in such manner that the passage of the light is diminished. Up to this time and before the screen has begun to move the second selenium cell undergoes no changes; but as soon as the screen begins to move its resistance will constantly become correspondingly greater in agreement with the gradual diminution of light. But now the diminished transparency acts on the two selenium cells simultaneously, namely on the first cell in such manner that the resistance which had previously sunk in consequence of increased luminous action rises corresponding to the decrease in light in consequence of the diminished transparency; consequently the first selenium cell occasions a gradual increase in the magnetic force of the iron cores of the magnet, so that the screen cannot now move so far as it could before. But since the second selenium cell likewise increases in resistance in consequence of the reduced transparency, it acts in such manner on the magnet that the magnetic force is diminished. But since the changes of resistance occasioned at the two selenium cells are caused by the same cause, namely diminished transparency at the screen, the changes in resistance must be equally large in the two cases and act in the same sense on the polarized iron cores of the magnet. The consequence is that neither the one nor the other selenium cell can exercise such an influence on the movable part of the screen after the screen has been adjusted corresponding to the transparency of the film, but that, on the contrary, on the basis of the total action of the two selenium cells the original adjustment of the screen must be maintained until an alteration in the transparency of the film, which no longer corresponds to the given position of the screen, causes the movable part of the screen to be adjusted afresh.

In order that my invention may be clearly understood I will now explain the same with reference to the accompanying drawings in which several embodiments are diagrammatically represented by way of example.

Figure 6:
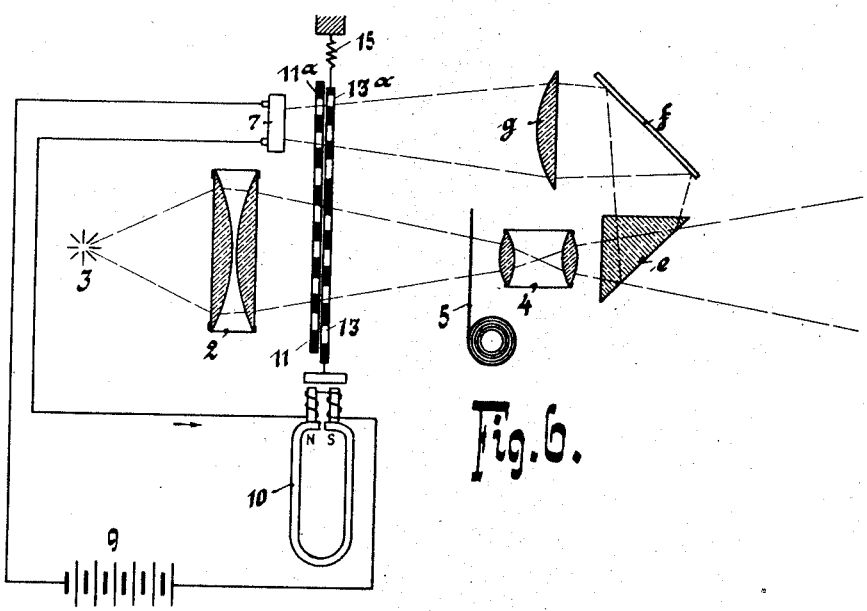

In said drawings:—Figure 1 illustrates diagrammatically one form employing one screen, and Fig. 2 shows diagrammatically another form in which the source of light itself is influenced; Fig. 3 is a form of the electromagnet used for moving the screen; Fig. 4 shows diagrammatically another form of the invention in which a two-part screen is employed; Fig. 5 is a diagram of another form in which the generator for the source of light is influenced, whereas Fig. 6 shows diagrammatically another form in which a double screen is employed, and Fig. 7 shows diagrammatically a modified form of arrangement containing a two-part screen, and Fig. 8 shows a screen movable around only one axis.

Referring to the drawing, and firstly particularly to Fig. 1, 1 is the usual chamber having the condenser 2 and containing a source of light 3. A picture is projected by means of the objective 4 from the film 5 onto the sheet 6. Now according to my invention I employ a selenium cell 7 which is preferably arranged in a hollow mirror 8 of suitable shape in such manner that the rays of light reflected from the sheet 6 are received by the mirror 8 and thrown onto the selenium cell. The latter is in a circuit which contains in addition to the battery 9 an electromagnet 10, so that this is energized the more, the greater the current is which passes from battery 9 when the illumination of cell 7 is increased. Preferably there is arranged between condenser 2 and objective 4 or at another suitable place a suitable screen which is to be influenced by the electromagnet 10. In this constructional form a two-part screen 11, 13 is supposed, as clearly shown. The one part 11 of this screen is arranged in a fixed frame 12, whereas the other 13 carried in a frame 14 is attached to a spring 15 mounted on a frame 16. On its other side frame 14 is attached to the end of a two-armed lever 17 which is pivoted at 18 and carries at its other end an armature 19 which is opposite the electromagnet 10. Consequently, when the latter is energized it can laterally displace the movable screen 13 by means of lever 17 and tension spring 15. Now if it be supposed that the lines of the parts 11 and 13 acting as screens are normally, i. e. when electromagnet 10 is correspondingly energized, located so that they are half open, the normal quantity of light will pass through them from the source of light 3. But if the film is then too transparent in comparison with this quantity of light, the resistance of the selenium cell 7 becomes smaller and electromagnet 10 stronger, so that the spaces between the lines become smaller and the quantity of light is correspondingly diminished. Consequently, in spite of the transparent portion of film only the same quantity of light is reflected by the sheet.

Instead of the simple electromagnet a polarized magnet can be employed, as indicated in Fig. 1, whereby the screen is also under the action of the spring and magnet when no light falls on the sheet, so that the oscillations of the screen are more exact and the entire device is much more sensitive to the fluctuations of current produced by the selenium cell. In order to obtain still greater sensitiveness a magnet constructed according to Fig. 3 can be employed. In this figure there is provided between the poles of a constant magnet 22 the coil 23 influenced by the circuit closed through the selenium cell, said coil being provided with a lever 24 which acts directly on the screen, as clearly shown. As previously mentioned above, the same effect can be obtained by increasing or diminishing the source of light itself in agreement with the transparency of the film. Fig. 2 shows this constructional form. The source of light 3 is here fed from a generator 20 whose field can be demagnetized, for example, by a coil 21. This coil is located in the circuit fed by battery 9 and containing the selenium cell 7. Therefore, if the selenium cell is energized when the sheet 6 is too brightly illuminated it causes a stronger current to pass through coil 21 and the generator 20 to be correspondingly demagnetized. The current supplied by the latter thus becomes weaker and also the source of light 3.

Referring now to the constructional form shown in Fig. 4, 2 designates the condenser, 3 the source of light, 4 the objective, and 5 the film. 7 denotes the selenium cell located in a hollow mirror 8, which cell is in the circuit of a battery 9 and acts on an electromagnet 10 by means of the winding $a$. Between the condenser and film is attached a suitable screen, e. g. the two-part screen 11, 13, of which part 11 is stationary and part 13 movable under the influence of electromagnet 10 which acts on the one end of the part of the screen, whereas this part is subjected on its other side to the action of a spring 15. According to my invention I employ a second selenium cell $b$ which is illuminated by means of a transparent, slantingly arranged mirror $c$ by light which has not passed through the film 5. This second selenium cell is also located in a circuit containing battery 9 and likewise acts on the polarized magnet 10 but with a special winding $d$.

The device operates as follows:—The screen 11, 13 is adjusted in such manner that when a film of average transparency is employed and when the selenium cells 7 and $b$ are illuminated correspondingly the slits in the parts 11, 13 are half open, as mentioned above. It will now be supposed that the part of the film which is to be projected is more transparent as compared with a part assumed to be normal. Then, in spite of this greater transparency of the film, the selenium cell $b$ is not influenced at first, since the light passing through the screen has remained the same. The resistance of this selenium cell and with it the influence on the polarized electromagnet therefore undergoes no change. In the case of the selenium cell 7, on the contrary, as already described above with reference to Fig. 1, a diminution of resistance takes place at this moment in consequence of the greater quantity of light reflected by the sheet, so that the polarized iron core of the electromagnet 10 is demagnetized by winding $a$ more than is the case normally. Consequently, the electromagnet will lose part of its force so that the tension spring 15 can move the part 13 somewhat in such manner that the transparency of the screen 11, 13 is diminished. Now as soon as this adjustment of the screen begins, however, the quantity of light passing through the film is diminished by steps and consequently constantly less light must act on selenium cell 7. This cell will of course increase in resistance at the same rate and lose its demagnetizing influence in like manner on the polarized iron core of the permanent magnet, in other words will tend no longer to move the part 13 so far as this was the case shortly before, when the normal quantity of light was thrown through the more transparent part of the film onto the sheet and when the selenium cell possessed a greater perviousness to current in consequence of diminished resistance and the screen 13 itself had experienced as yet no movement. If the selenium cell had been able to follow this tendency, as is the case in the constructional form described above with reference to Fig. 1, it will be readily understood that it would be impossible to completely cancel the excess of light as compared with the normal value. In order to attain this end the cell $b$ is employed which was likewise influenced with regard to its resistance when the part 13 was moved by the first excitement of cell 7 for diminishing the transparency. Then a diminished quantity of light likewise fell simultaneously on cell $b$, its resistance was increased as compared with its average value, and consequently the polarized electromagnet 10 was simultaneously weakened by winding $d$ in such manner that in proportion as the selenium cell increased its resistance again after its first action with the diminished quantity of light brought about on the sheet, the selenium cell $b$ acted through winding $d$ on the part 13 in agreement with the diminished perviousness. The resulting influences of the cells 7 and $b$ on the iron cores of the polarized electromagnet 10 act by their exercising always the same influence on the magnet, in other words, the screen 13 must remain in that position which is given to it at the beginning by the first influence of the cell 7, when the new aperture of the screen corresponds to the increased transparency of the film and causes such a screening effect that the increased transparency is negatived and only the average quantity of light acts on the sheet. In like manner, only reversely, do the two cells 7 and $b$ act on the screens 11 and 13 when the transparency of the film is diminished as compared with its normal value, namely when the transparency of the film is diminished corresponding to the increase in transparency of the screens 11, 13.

Similarly as described above with reference to Fig. 2, in this last described constructional form of my invention the screen shown in Fig. 4 can be omitted and the selenium cell can act on the generator 20 for the arc 3, as clearly shown in Fig. 5. Here the cell 7 again acts on coil $a$ and cell $b$ on winding $d$ of the generator 20. The influence on this generator is, of course, the same as on the polarized electromagnet according to Fig. 4. Corresponding to the fluctuating exciting current the arc 3 becomes larger or smaller and with it the quantity of light acting on the film is varied. As Fig. 5 further shows, the selenium cell $b$ can be placed directly opposite the source of light 3, the mirror $c$ shown in Fig. 4 being omitted.

The same action as is obtained in the form according to Fig. 4, in which the light is regulated by a screen and two selenium cells, can also be obtained with only one selenium cell. In this event a portion of the light which has passed through the film is sent through a special screen before it arrives at the selenium cell. This screen acts in an opposite sense to the screen in front of the arc, namely when the latter screen opens the passage for light the former simultaneously closes.

The screen employed in Fig. 6 comprises an immovable part 11 and a movable part 13 to which is attached on the one hand the armature of magnet 10 and on the other hand spring 15. As shown in the drawing, this screen is so broad that it screens both the light emitted by the arc and the portion of light deflected by prism $e$ and falling on the selenium cell 7 which has passed through film 5. In the event of the armature of magnet 10 being attracted and the movable part of the screen being consequently moved thereby, the one portion $13^a$ of the movable part of the screen, i. e. that through which the light falling on selenium cell passes, acts oppositely to the portion through which the light of the arc passes in such manner, e. g., that during this motion the apertures in the last mentioned portion of this screen are enlarged, while the apertures in portion $13^a$ of the screen, through which the light falling on the selenium cell passes, are diminished, whereas the reverse action takes place, in the event of the armature being released by the magnet, for example, and moved upwardly by spring 15, when the apertures of the portion of the screen located in front of the selenium cell are enlarged, while in this event those in front of the arc are diminished. In the case of normal transparency of the film 5 and corresponding illumination of cell 7 the two parts of the screen 11, 13 and $11^a$, $13^a$ are half open. Now if the projected part of the film becomes more transparent, for example, a correspondingly larger quantity of light will act by way of prism $e$, mirror $f$ and lens $g$ on the selenium cell 7, the resistance of the same will be decreased and magnet 10 weakened, in other words part of the screen 11, 13 will close, less light will pass through the film 5 onto the sheet, but also correspondingly less light will pass through prism $e$ by way of mirror $f$ to selenium cell 7. It must be taken into consideration, however, that by the above mentioned adjustment of part of the screen 11, 13 the screen $11^a$, $13^a$, was also simultaneously correspondingly adjusted, but in such manner that the transparency for the light reflected by mirror $f$ and falling on the cell was increased, whereas it was diminished by part of the screen 11, 13 for the light coming from the source of light. Consequently the transparency of the screen 11ª, 13ª is greater relatively to the normal state, whereas it is smaller in the case of part of the screen 11, 13.. Corresponding to this increase in transparency, however, the light which has gone to the screen 11ª, 13ª by way of prism e and mirror f after the adjustment of the screen 11, 13 is now screened less than in the normal state of the screen 11ª, 13ª so that in spite of part of the screen 11, 13 having been diminished less light does not illuminate the selenium cell now and consequently there is also no occasion for the temporary resistance produced by the more transparent portion of the film to be varied, in other words the screen 11, 13 remains in a position which corresponds exactly to the transparency of the film at any time. Here also a generator may be used instead of the polarized electromagnet 10, of course, without departing from the spirit and scope of the invention. The screen which throttles the light coming from the light chamber must of course be omitted however, and the parts of the screen 11ª, 13ª are solely used. Further, it is possible to arrange the selenium cell 7 not only in front of, but also behind the sheet in the focus of a hollow mirror made so large that it collects the entire light on the sheet and imparts it to the selenium cell. Again, when selenium cells have been spoken of in the above, it is to be understood that the invention is not limited by these, but that instead of them thermoelectric cells or any other suitably sensitive means which react to light may be used.

In those cases when the screen is used in the form of a two-part line screen, it is preferable to suspend the movable part 12 with its frame on two pivoted levers h and i, as shown in Fig. 7. Lever i is connected below with the spring 15 and its other end is under the influence of the polarized electromagnet 10. When the fulcrums k and l of the two levers are located in one plane, in this constructional form the frame of screen 12 must be moved exactly at right angles to the lines of the screens and perfectly rectilinearly, so that the screen can be adjusted and regulated exactly. Further, when the levers and the screen are mounted between centers the device is very suitable for very sensitive adjustment.

It is to be understood that the drawings show only some preferred constructional forms of my invention; no other constructional forms are represented on them.

I claim:—

1. In means for regulating the illumination of unevenly transparent films in kinematographs, the combination with the kinematograph having a source of light and a film movable in front thereof, of electrical means comprising an electric circuit containing means which react to light for increasing and diminishing the strength of light falling on the film, said means which react to light being illuminated by light which has passed through said film.

2. In means for regulating the illumination of unevenly transparent films in kinematographs, the combination with the kinematograph having a source of light and a film movable in front thereof, of adjustable means between said source of light and said film for increasing and diminishing the strength of the light falling on the film, and electrical means comprising a selenium cell for operating said adjustable means, said selenium cell being illuminated by light which has passed through said film.

3. In means for regulating the illumination of unevenly transparent films in kinematographs, the combination with the kinematograph having a source of light and a film movable in front thereof, of adjustable means between said source of light and said film for increasing and diminishing the strength of the light falling on the film, and electrical means comprising two selenium cells for operating said adjustable means, one of said cells being illuminated by light which has passed through said film and the other cell being illuminated by light from said source of light before it has passed through said film.

4. In means for regulating the illumination of unevenly transparent films in kinematographs, the combination with the kinematograph having a source of light and a film movable in front thereof, of a two-part, adjustable screen between said source of light and said film, and an electric circuit comprising a battery, an electromagnet and a selenium cell, said electromagnet being adapted to operate said screen, and said cell being illuminated by light which has passed through said film.

5. In means for regulating the illumination of unevenly transparent films in kinematographs, the combination with the kinematograph having a source of light and a film movable in front thereof, of a two-part, adjustable screen between said source of light and said film, a magnet for operating said screen, two electric circuits each having an oppositely-wound coil on said magnet, and two selenium cells arranged one in each circuit, both said selenium cells being illuminated by light from said source of light, and one of said selenium cells being illuminated by light which has passed through said film.

In testimony whereof, I affix my signature in the presence of two witnesses.

BRONISŁAW GWÓŹDŹ.

Witnesses:
 HENRY HASPER,
 WOLDEMAR HAUPT.